United States Patent Office 3,027,994
Patented Apr. 3, 1962

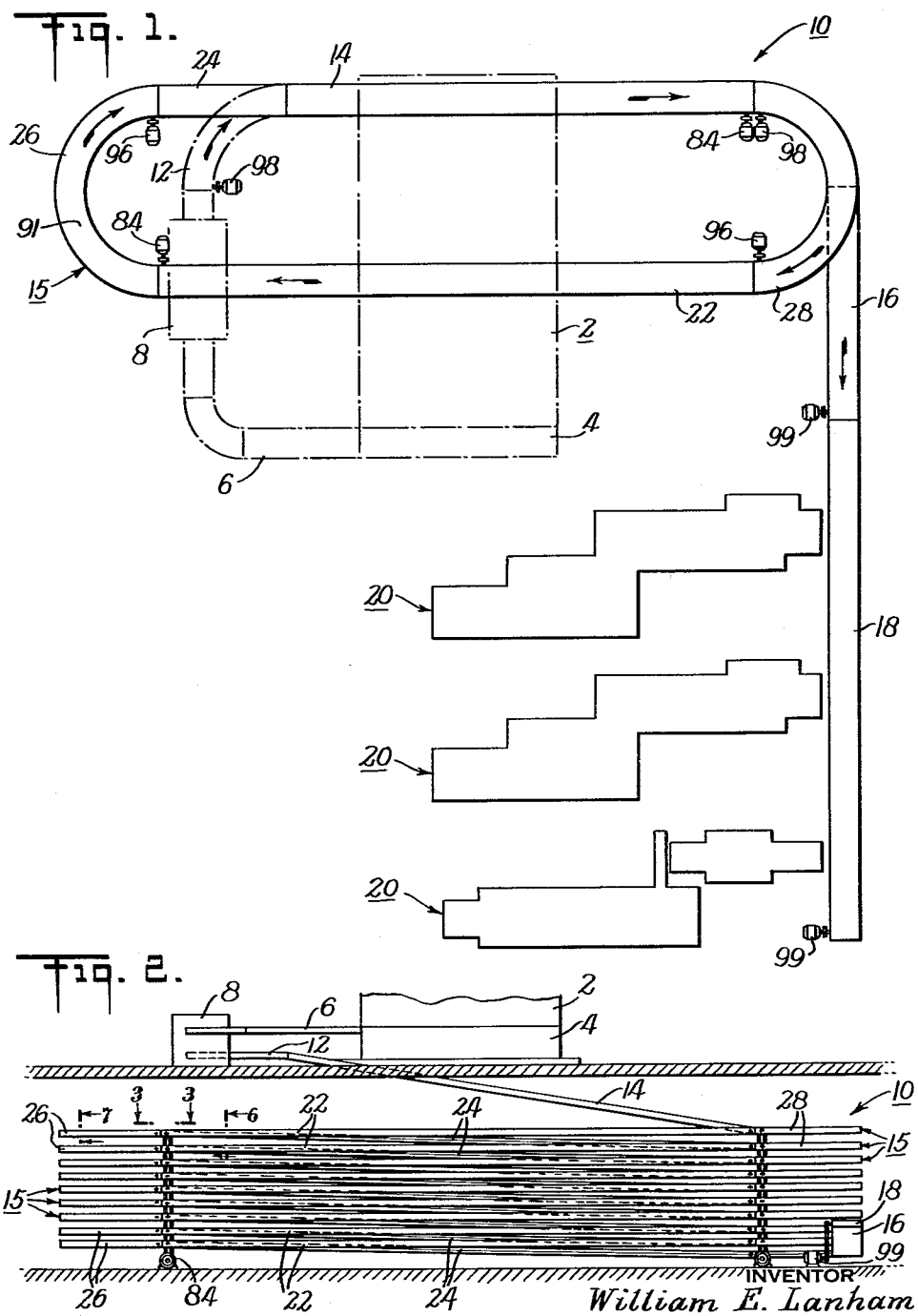

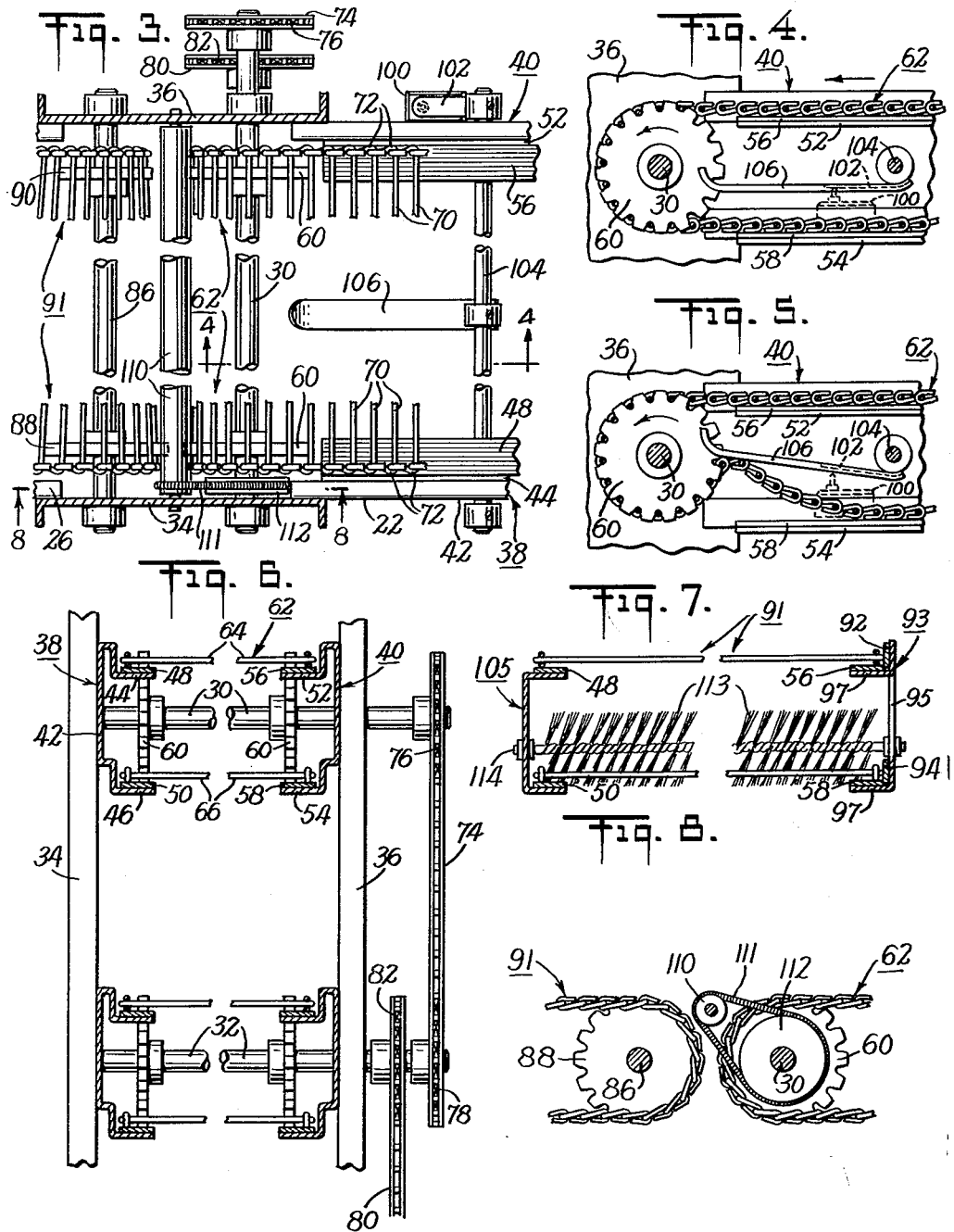

3,027,994
BREAD AND ROLL COOLER
William E. Lanham, 780 Stewart Ave. SW., Atlanta, Ga.
Filed May 7, 1954, Ser. No. 428,214
3 Claims. (Cl. 198—230)

This invention relates to the continuous cooling of bread products (and more in particular to an improved continuous system of the type disclosed in my co-pending application, Serial No. 292,911, filed June 11, 1952 now abandoned.

An object of this invention is to provide for the cooling of bread products in a thoroughly practical and efficient manner with minimum labor, and also at minimum initial cost and cost of operation. A further object is to provide for the above with apparatus which is relatively easy to manufacture and install and maintain, and which is adaptable to the great variety of conditions of installation and operation which are encountered in different bakeries throughout the country. A further object is to provide a thoroughly practical construction of the above character which may be operated without the need for constant attention by skilled personnel, and which will maintain steady and reliable operation, whereby the bread products from the oven are conveyed in a steady stream through the cooling zone and to the zone for further processing such as slicing and wrapping or other packaging.

A further object is to provide a thoroughly practical and dependable bread handling system which cleans itself automatically in the course of operation. A further object is to provide a bread or roll cooling and wrapping system which operates with minimum danger of damage to the bread products and with dependability of action under varying conditions of operation. A further object is to provide for the above in a manner to insure that the operators will be able to work steadily, without having to speed up their operation and without there being idle periods. These and other objects will be more clearly pointed out below.

In the drawings:

FIGURE 1 is a somewhat schematic top plan view of one embodiment of the invention;

FIGURE 2 is a side elevation of the main portion of the unit of FIGURE 1;

FIGURE 3 is a horizontal sectional view with parts broken away on the line 3—3 of FIGURE 2;

FIGURE 4 is a sectional view on the line 4—4 of FIGURE 3;

FIGURE 5 is a view similar to FIGURE 4 but showing a condition of faulty operation;

FIGURES 6 and 7 are vertical sectional views on the lines 6—6 and 7—7, respectively, of FIGURE 2; and FIGURE 8 is a sectional view on line 8—8 of FIGURE 3.

The baking of bread and related products has become a large-scale mass production operation. This involves the mixing of large quantities of flour and other constituents and the baking of the bread in accordance with a routine and somewhat automatic and continuous operation. The baked bread is removed from the ovens and is then cooled. It is normally sliced and wrapped, although the slicing may be omitted, and at last the bread products may be packaged in bulk for shipment to retail outlets. It is of course the object of this type of operation to produce bread of uniform high quality and to preserve this quality to the time of use. Hence, a great deal of effort has been spent upon improvements in handling and wrapping or packaging to maintain the bread in "fresh" condition.

The main reason that bread gets "stale" is that insufficient moisture has been lost from the loaf prior to the time that it is wrapped. The loss of moisture is related to the manner and amount of cooling prior to wrapping, and numerous experiments have been run to determine the optimum temperature for the bread at the time of wrapping. Generally each baker has determined for himself a preferred mode of cooling and a preferred wrapping temperature for the bread. In any event, the bread must not be too hot at the time of wrapping or it will sweat within the wrapper; also, trouble will be experienced in the slicing and wrapping operation.

Some bakeries provide for the cooling of bread in racks which are on wheels or casters so that they may be moved from the vicinity of the ovens to the vicinity of the slicing and wrapping machines. However, this requires a large amount of manual labor in loading and unloading the racks and in moving the racks. Furthermore, this involves high expense for upkeep for the racks and the floors over which they are rolled, and there are additional expenses because of accidents which damage the bread and bread products, and the workman may be injured. When bread is cooled in racks, it is difficult to provide a continuous, steady operation from the ovens to the slicing and wrapping machines, with the result that some of the operators are overworked part of the time and are idle at other times, and the slicing and wrapping machines are not used at maximum capacity.

In some larger bakeries, continuous bread coolers have been provided wherein the bread is placed upon trays and is moved through a cooling chamber where it is subjected to a carefully controlled cooling operation. This type of equipment is large and expensive and it requires considerable attention to maintain it in clean, first-class working condition. Bread has been cooled by passing it through vacuum chambers which are refrigerated so as to speed up the cooling operation. This is apt to remove an excessive amount of the moisture from the bread so that the bread does not remain "fresh." Furthermore, it is difficult to control the operation so as to properly cool the loaves of different sizes and types, and which enter at different temperatures. It is an object of the present invention to provide for the cooling and transporting of the bread between the ovens and the slicing and wrapping machines without the difficulties which have been encountered with prior systems.

The illustrative embodiment of the present invention comprises a cooling system formed by a continuous self-cleaning cooler-conveyor arrangement which receives the bread as it is removed from the pans at the ovens and which carries the bread to the floor below along a somewhat spiral cooling path, and then delivers the bread at the desired temperature to the slicing and wrapping machines. The cooling system of the present invention occupies a relatively small amount of space and it is adapted to be fitted into space which would have little or no other use. The bread products are handled in a very careful and gentle manner so that even small size products such as rolls are not damaged, and the cooling is solely by contact with the air in the bakery. It has been found to be practical to control the humidity and temperature conditions within a bakery, and the particular bread cooling system in each bakery is so constructed and arranged that the bread is cooled to the optimum temperature at the time that it reaches the slicing and wrapping machines. The air in the bakery has relatively high humidity, and this factor and the slow rate of cooling prevent excessive extraction of moisture from the bread. The movement of the bread is relatively slow, but the rate of movement is so controlled that it reaches the slicing and wrapping machines in the desired period of time.

Referring to FIGURES 1 and 2 of the drawings wherein an illustrative embodiment of the invention is shown, the bread is baked in ovens 2 (indicated in broken lines in FIGURE 1), and it is unloaded from the ovens at 4 and passed by a steel conveyor 6 to a depanner 8 where it is removed from the bread pans. The hot loaves are then delivered to the top of a continuous conveyor type cooler 10 which has its bread receiving end section at 12. Section 12 is a wire belt conveyor section of special construction described below and it makes a ninety degree turn and delivers the bread to an inclined section 14 which extends downwardly through an opening in the floor to the top tier of the somewhat spiral cooler. In this embodiment there are nine tiers and the bread moves in a continuous line downwardly around the nine tiers successively.

From the bottom tier the bread is delivered to an upwardly-inclined section 16 which elevates the bread to the level of a conveyor 18 from which it is removed for slicing and wrapping in the slicing and wrapping machines 20. Each of the tiers 15 is formed of four sections (FIGURE 1), there being two straight substantially parallel side sections 22 and 24 and two semi-circular end sections 26 and 28. Sections 22, 26 and 28 are horizontal, but sections 24 are inclined downwardly so that they extend from one tier to the tier below. Hence, the bottom tier terminates in a section (not shown) which makes a ninety degree turn and delivers the bread tangentially to section 16.

Each of the sections is formed by a continuous wire grid-type belt, which has a top run upon which the bread is supported and moved and a bottom return run. Each of these belts is supported by two spaced sets of sprocket wheels mounted respectively at the ends of the section. One set of sprocket wheels for each belt is driven so as to move the belt, and the other set is an idler support and guide means. Each set of sprocket wheels is rigidly mounted upon a supporting shaft which is mounted to rotate freely in bearings mounted on the frame. Each run of the belt is supported at its sides or edges so that the top run will carry the bread quietly and smoothly from one end of the section to the other. The details of construction for each of the sections are shown in FIGURES 3 to 8, but it should be understood that the general construction is the same throughout, and the construction is adaptable for use where the configuration of the cooling system is substantially different from that here shown.

Referring particularly to FIGURE 6, a pair of shafts 30 and 32 are mounted in vertical alignment in bearings supported by vertical channels 34 and 36. Channels 34 and 36 also support a set of horizontal belt-supporting channels comprising left-hand or outside channels 38 and right-hand or inside channels 40. Each of channels 38 has a vertical plate portion 42 and two integral track portions 44 and 46, respectively, along the upper and lower edges of the plate portion. These track portions are L-brackets with top horizontal ledge surfaces to which are fixed strips 48 and 50 respectively. These strips 48 and 50 are Micarta which is formed of cloth and paper sheets impregnated with laminated phenol-formaldehyde resin and having a smooth low-friction top surface. The strips are attached by a cement which is not damaged by the oils and other constituents of the bread products. Channels 40 are identical with channels 38 except that their track portions 52 and 54 extend to the left and carry Micarta strips 56 and 58, respectively. These strips 48, 50, 56, and 58 form pairs of supporting tracks for the two runs of the belt 62.

Rigidly mounted upon shaft 30 in vertical alignment respectively with the two pairs of tracks are two sprocket wheels 60 which support one end of a wire belt 62 which has a top run 64 and a bottom run 66. The sprocket wheels, not shown, at the undriven end of each conveyor belt such as belt 62 may be identical to the sprockets at the driven ends or if desired they may be blank, or tooth-less sprockets. The top run 64 of belt 62 is supported at its side edges upon strips 48 and 56 and the bread rests upon the top of this run of the belt. The bottom run 66 is similarly supported upon strips 50 and 58. Belt 62 is formed of individual grid links, each of which is one-eighth inch diameter round rod having a main straight or grid portion 70 and an involved loop or link portion 72 at each end. Each of these link portions extends around the end portion of the next adjacent grid link so that the continuous belt is formed with chain-like edges or side portions, and with transverse rods or grid portions which extend transversely of the side edges of the belt and parallel to each other. The interlocking relationship between the grid links is formed by each loop extending around the base of the loop of the next grid link; that is (see FIGURE 3), somewhat back on itself and in the direction of movement of the belt and downwardly; then upwardly and rearwardly with respect to the movement. Thus, each end portion extends beneath the next grid link and thence upwardly over the top thereof.

The top run 64 has the ends of the straight portions of each grid link riding flat upon the top surfaces of strips 48 and 56 so that a substantial line support is given for the ends of each grid link. These grid links are sufficiently rigid to support the bread without bending, and the weight of the bread is evenly distributed over a large number of the grid links. The Micarta is smooth and has extremely low friction to the moving metal grid links, with the result that the belt moves with minimum driving effort even under a full load of bread products.

Belt 62 has movement transmitted to it by the sprocket wheels 60, the sprocket teeth of which have the same pitch as the grid links of belt 62. Thus, as the sprocket wheels are turned, the sprocket teeth pull upon the ends of the grid links and pull the top run of the belt along the tracks formed by strips 48 and 56. The bottom run 66 of the belt is pushed by these same sprocket wheels. As indicated above, sprocket wheels 60 are rigidly mounted on shaft 30, and the shaft is turned from shaft 32 by a chain 74 through a driving sprocket wheel 76 on the end of shaft 30 and a similar sprocket wheel 78 on the end of shaft 32. Shaft 32 is in turn driven through a chain 80 and a sprocket wheel 82 from a sprocket wheel on the tier section below. Thus, referring to the left-hand portion of FIGURE 2, the section 22 for each tier is driven by a single motor 84 which is connected to drive this section of the lowest tier, and the tiers are interconnected by a sprocket wheel and chain drive (the upper portion of which is shown in FIGURE 6) so that each tier section is driven from below from the bottom to the top tier.

The details of construction of each of sections 22 are identical with the top section just described and each of the other sections 12, 14, 16, 18, 24, and 28 is similar except that the curved sections are somewhat different in that they are adapted to move smoothly around the curves. Accordingly, as shown at the left in FIGURE 3, a shaft 86 carries a pair of sprockets 88 and 90 which carry the end of a belt 91 of the top tier section 26. Sprocket 88 is identical with sprockets 60, but sprocket 90 is of less diameter and it has the same number of teeth so that its side of the belt is moved at a slower rate than the other side. Referring to FIGURE 1, the side of the belt section 91 on the inside of the curve moves at a speed which is less than that at the outside of the curve by the ratio of the radius of inside curve to the radius of the outside curve. Therefore, the straight or grid portions of the grid links move around the curve somewhat in the manner that the spokes of a wheel would move if the wheel were turned with its axis at the center of curvature of the tier section.

During operation, belt 91 tends to crowd toward the inside of the curve (which is to the right in FIGURE 7) and the track construction for these belt sections and the other curved belt sections is so constructed as to allow for this tendency. Accordingly the track structure 93 at the right is formed by a vertical plate portion 95 from which ledge portions 97 extend. These ledge portions carry the track strips 56 and 58 upon their horizontal surfaces, but at the right of them there are vertical strips 92 and 94 of identical Micarta against which the side edge of the belt rides. The outer track structure at the left of the figure is formed by a channel 105 which has flanges upon which the Micarta strips 48 and 50 are supported. This maintains the links in the proper alignment and insures the smooth, low-friction movement of the belt. Sections 24 driven, as shown in FIGURE 1, by a motor 84 with a pulling action upon the load-carrying top, run in the same manner in which sections 22 are driven. Sections 26 and 28 are driven by two motors 96 with a similar pulling action upon the top runs. Section 12 is driven by motor 98 with a pushing action upon the load-carrying top run and another motor 98 drives the similar section which extends from the bottom tier to section 16. Two additional motors 99 drive sections 16 and 18 with pulling actions upon the top runs.

To facilitate a smooth transfer of the bread products, especially those of small size such as rolls or buns, from one conveyor section to the next, a cross-over roller is provided at the junction of the sections. By virtue of this arrangement, both bread loaves and rolls or buns can be handled interchangeably, or if desired, at the same time, by the cooling system. An illustration of such a cross-over roller is shown in FIGURE 3 wherein roller 110, driven by a spring belt 111 carried on pulley 112 fixed to shaft 30, is positioned between the respective ends of conveyor belts 62 and 91. As shown best in FIGURE 8, roller 110 is mounted so that its surface is level with the top runs of these belts. Thus, the individual large and small bread products upon reaching the end of belt 62, are carried by the moving surface of roller 110 over to belt 91 without any possibility of their falling or jamming into the gap between these belts.

In any system of this type, the crumbs tend to adhere to the grid wires and to each other so that agglomerates of crumbs tend to form. These interfere with operation and are hard to remove. They also fall indiscriminately so as to litter the surfaces below the conveyors. Moreover, since absolute cleanliness is of prime importance, at least periodic thorough cleaning is necessary but this tends to be expensive and time consuming, and interferes with the operation of the system. A particularly advantageous cleaning arrangement is provided in this system in accordance with the present invention which overcomes these difficulties. This arrangement not only cleans the bread conveyor belts continuously, thereby preventing any accumulation, but it also cleans itself at the same time. It also removes the crumbs at discrete points so that they may be collected in removable trays. A particular embodiment of this arrangement is shown in FIGURE 7 and comprises a long rotary or spiral brush 113 mounted on a freely rotating axle 114 which extends between channels 93 and 105. Axle 114 is mounted low enough so that the ends of the bristles of the brush engage and pass between the grid wires 70 of the lower run of belt 91 but do not engage the top run thereof. As grid wires 70 pass along members 50 and 58, the brush is rotated and its bristles effectively clean the entire surface of each grid wire. Any crumbs or particles which tend to adhere to the wires or the brush are removed by the mutual action between the wires and bristles and then fall downwardly into a collecting tray or any other appropriate receptacle (not shown). These brushes and trays are installed in this manner at the product discharge end of each conveyor section and their cleaning action is automatic since no separate provision for powering them is needed. The crumbs are collected in this way in reasonably clean condition and are undamaged. It should also be noted that the removal and collection of the crumbs facilitates maintaining absolute cleanliness, and the conveying mechanism is not subjected to the harmful effects of the crumbs.

Under some conditions of operation, such as when the belts become loose or break, the belts may tend to cling to their driving sprockets and this may cause difficulty if the driving operation is not discontinued immediately. Accordingly, adjacent each of shafts 30 and 32, and also adjacent each other shaft which drives a belt, there is a safety cutout unit of the type shown in FIGURES 3, 4 and 5 which acts to stop all of the driving motors for the entire system whenever any belt tends to cling to its driving sprocket. Each of these safety cutout units also operates a signal (not shown) which will call the operator and also locate the faulty belt which has caused difficulty. The operator may then correct the fault and restart the motors.

Each of these safety cutout units is formed by a normally closed switch 100 mounted on channel 40 and having its contactor normally engaged by a arm 102 rigidly carried by a shaft 104. Shaft 104 is journaled in the channels 40 and 42 and at its center it carries a feeler arm 106. Feeler arm 106 is held normally by gravity in the horizontal position of FIGURE 4, and its weight is sufficient to hold switch 100 closed. However, when the belt tends to cling to the driving sprockets so as to ride up as shown in FIGURE 5, it engages and lifts the feeler arm, and arm 102 is also swung upwardly away from switch 100 so that the switch automatically opens. As indicated above, this stops all of the driving motors for the belts and the switch also operates a signal which locates the section which has stopped the motors. The stopping of the belt-driving operation does not in any way damage the bread being cooled, and all that can happen is that the bread may become cooler than is normally preferred. This safety cutout arrangement prevents damage to the equipment, and the fault can be readily corrected.

With the system as described above, the loaves of bread are positioned and moved in spaced relationship from the oven and through the cooler to the slicers and wrappers. For example, they may be positioned so that they move lengthwise, and there is sufficient space between them for the air to circulate freely by natural circulation. The belts move at such a rate as to carry the bread from the oven at the rate at which it is baked, that is, if bread is being baked at the rate of 60 loaves per minute, then the belts move to carry away fifteen of the rows of bread per minute with each row comprising four loaves. The total length of the cooling path is such that the bread has reached the desired temperature at the time that it reaches the slicing and wrapping machines. The free circulation of air past all sides of the loaves permits them to cool at a steady rate, and the bread retains the desired amount of moisture. The cooling time for the bread varies with the various installations, but generally this is in the order of 65 to 70 a minute. As indicated above, different bakers consider different wrapping temperatures desirable and the wrapping temperature varies with the type of bread. However, in wrapping it has been found that temperatures between 95° F. and 105° F. are acceptable for most types of bread.

In the illustrative embodiment of the invention, the cooler is positioned in a rectangular space on the floor beneath the ovens. However, as indicated above, the tiers may be of different configurations to make the cooling system occupy space which has little or no other use. Thus, for example, the tiers may be suspended in a high ceiling bakery; a smaller number of long tiers may be provided or the tiers may extend around the outside wall along the ceiling. However, with any type of construction, the basic elements of the illustrative embodiment are used with changes to adapt the system to the requirements of the particular installation. As a basic concept, the cooling system is carrying at all times an amount of bread equal to the production for the cooling period and at such a rate that it carries away the bread as rapidly as it is produced. Thus, variations can be made to adapt the system to the requirements of any particular installation.

I claim:

1. An article conveying system for handling bread products and the like, and which keeps itself clean while in operation, said system including a pair of spaced apart long, narrow guide members defining a pair of top sliding surfaces and a generally parallel pair of bottom sliding surfaces closely spaced beneath said top surfaces, a conveyor section having an endless conveyor belt formed of a multitude of transverse very long thin generally parallel rods which are adapted to directly contact and support the products, the spacing between said rods being greater than their diameter, mounting means for supporting and driving said belt generally horizontally in a top run on said top surfaces and a closely spaced parallel bottom run on said bottom surfaces, and cleaning means for keeping each of said rods spotlessly clean and polished along its length and around its circumference, said cleaning means comprising a freely rotatable bristle brush having a cylindrical diameter much greater than that of each rod and greater than the spacing between adjacent rods and having an effective length much greater than its diameter and substantially equal to the length of the rods, said brush being rotatably mounted generally parallel to said rods with its bristles projecting freely and thoroughly between them a substantially fixed distance, said guide members at least in the vicinity of said brush preventing lateral deflection of said belt as it passes over said brush, the product conveying movement of said endless belt conveyor causing each of said rods to contact the bristles of said brush with a sliding and bending action thereby to rotate said brush and to deflect its bristles to cause them to polish the surface of each rod substantially throughout its length and substantially 360° around its circumference, whereby each of said rods is subjected to a continual cleaning and polishing action during each movement past said brush thereby to maintain the rods clean and polished throughout the entire width of the conveyor belt with the result that foreign particles are removed from the rods and the polished surface of the rods tends to prevent adherence of the particles.

2. The system as in claim 1 wherein said guide members include a pair of laterally spaced narrow channels having upper and lower generally parallel slide surfaces, and wherein the ends of said brush are rotatably journalled between said channels directly above said lower slide surfaces whereby a plurality of said sections can be mounted one over the other closely spaced together, and said cleaning brush does not interfere with the continuous operation of said system.

3. An article conveying system which automatically keeps itself spotlessly clean and in sanitary condition, said system including a pair of spaced apart long narrow guide members defining a pair of top sliding surfaces and a generally parallel pair of bottom sliding surfaces closely spaced beneath said top surfaces, an endless conveyor belt comprising a multiplicity of transverse very long thin generally parallel rods which are adapted to come in direct contact with articles being conveyed, the spacing between said rods being substantially greater than their diameter, sprocket means for supporting the ends of said belt between said members and for driving the top run of said belt along said top surfaces and the bottom run along said bottom surfaces, and self-powered cleaning means for keeping each of said rods spotlessly clean along its length and around its circumference, said cleaning means comprising a long thin rotary brush having its ends rotatably journalled between said guide members closely above and generally parallel to the bottom run of said belt, the diameter of said brush being much larger than that of each rod and its length being slightly less than that of each rod, the bristles of said brush projecting downward freely and thoroughly between the rods in said bottom run between their ends only so that as said endless belt is driven along said guide members said brush will rotate and said bristles will radially slide against and be deflected by each rod and clean and polish it between its ends only substantially 360° around its circumference, and said brush will have a long service life and not interfere with articles being carried on the top run of said conveyor.

References Cited in the file of this patent

UNITED STATES PATENTS

| 126,172 | Barnstead | Apr. 30, 1872 |
| 574,621 | McCulloch et al. | Jan. 5, 1897 |
| 766,013 | Baldwin | July 26, 1904 |
| 1,472,679 | Roddy | Oct. 30, 1923 |
| 1,791,728 | Linfesty | Feb. 10, 1931 |
| 2,077,941 | Leonard | Apr. 20, 1937 |
| 2,083,864 | Puckett | June 15, 1937 |
| 2,624,444 | Casabona | Jan. 6, 1953 |

FOREIGN PATENTS

| 21,853 | Great Britain | Sept. 23, 1897 |